(12) United States Patent
Grazia Mora et al.

(10) Patent No.: US 9,220,370 B2
(45) Date of Patent: Dec. 29, 2015

(54) PAN-TYPE APPARATUS TO FRY OR BOIL FOOD PRODUCTS

(75) Inventors: Maria Grazia Mora, Bergamo (IT); Maurizio Mora, Lallio (IT)

(73) Assignee: ELFRAMO SPA, Bergamo (IT)

( * ) Notice: Subject to any disclaimer, the term of this patent is extended or adjusted under 35 U.S.C. 154(b) by 146 days.

(21) Appl. No.: 14/003,581

(22) PCT Filed: Mar. 8, 2012

(86) PCT No.: PCT/IB2012/000437
§ 371 (c)(1),
(2), (4) Date: Sep. 6, 2013

(87) PCT Pub. No.: WO2012/120368
PCT Pub. Date: Sep. 13, 2012

(65) Prior Publication Data
US 2013/0344213 A1 Dec. 26, 2013

(30) Foreign Application Priority Data
Mar. 9, 2011 (IT) .............................. UD2011A0034

(51) Int. Cl.
*A47J 37/12* (2006.01)
(52) U.S. Cl.
CPC .......... *A47J 37/1276* (2013.01); *A47J 37/1247* (2013.01)
(58) Field of Classification Search
CPC ............................ A47J 37/1276; A47J 37/1247
USPC ..................................... 426/438, 509; 99/403
See application file for complete search history.

(56) References Cited

U.S. PATENT DOCUMENTS

| | | | |
|---|---|---|---|
| 4,848,318 | A | 7/1989 | Brewer |
| 6,073,541 | A | 6/2000 | Oiwa |

FOREIGN PATENT DOCUMENTS

| | | | |
|---|---|---|---|
| GB | 2 323 023 A | | 9/1998 |
| WO | 03011092 A1 | | 2/2003 |

OTHER PUBLICATIONS

PCT Search Report dated Aug. 28, 2012 of Patent Application No. PCT/IB2012/000437 filed Mar. 8, 2012.

*Primary Examiner* — Jianying Atkisson
(74) *Attorney, Agent, or Firm* — Maine Cernota & Rardin (57) ABSTRACT

Pantype apparatus to fry or boil food products in a suitable liquid, it comprises a pan to contain the liquid, a first casing which delimits inside itself a closed housing chamber which houses at least part of the pan, burner means disposed in the housing chamber and suitable to generate a flame which, directly or indirectly, heats the pan and flue means to extract the combustion fumes from the housing chamber. The apparatus comprises separation means disposed in the housing chamber and suitable to define at least a first chamber adjacent to the pan, which houses said burner means, and a second chamber, between the first chamber and the walls of the first casing, which communicates on one side with the first chamber and is connected on the other side to said flue means. A conveying path (P) for the fumes is defined between said at least one first chamber and said at least one second chamber, so as to determine a forced transit of the fumes to lap the pan for a determinate transit time.

13 Claims, 5 Drawing Sheets fig. 1 fig. 2 fig. 3 fig. 6 fig. 5

PAN-TYPE APPARATUS TO FRY OR BOIL FOOD PRODUCTS

RELATED APPLICATIONS

This application is a national phase entry filed under 35 USC §371 of PCT Appliacation No. PCT/IB2012/000437 with an International filing date of 8 Mar. 2012, which claims the benefit of Italian Application No. UD2011A000034, filed 9 Mar. 2011. Each of these applications is herein incorporated by reference in their entirety for all purposes.

FIELD OF THE INVENTION

The present invention concerns a pan-type apparatus to fry or boil food products, in particular for use in the field of professional catering.

BACKGROUND OF THE INVENTION

It is known that frying or boiling a large quantity of food products in the field of professional catering is done using fryers or boilers provided with a pan which contains the cooking liquid and in which, once the latter has reached a suitable temperature, the food products to be fried or boiled are immersed, generally vegetables, pasta, fresh pasta, fish, meat but also confectionery products or other.

The pan is lapped on the outside by free flames usually produced by gas burners housed in a combustion chamber which surrounds the pan, which rapidly bring the liquid to the desired temperature.

Generally, a pressure fan is disposed upstream of the combustion chamber, to introduce therein the combustion air needed. The functioning of the fan is usually calibrated or adjustable to determine a balanced ratio of air/combustion gas in the combustion chamber so as to have the correct combustion.

The gas burners have a typical elongated structure and disposed below and at the two sides of the pan. Typically, a flue is provided disposed in a rear zone, so that the flames issuing from the gas burners tend to flow to the rear.

The mass of food to be fried or boiled is disposed in suitable baskets which, once filled, are immersed in the boiling liquid, which is usually oil for frying or water.

An apparatus for frying or boiling food products is described in the application WO-A-03/011092.

Before they are immersed into the boiling liquid, the food products are generally at a much lower temperature than that of the boiling liquid, and their immersion causes a sudden reduction in the temperature of the liquid, which must be immediately compensated by the action of the gas burners to bring the temperature back to boiling or frying point.

Consequently, a known limitation of the apparatuses in question is the consumption of gas to return the temperature to boiling or frying point.

Another limitation of known apparatuses is the sometimes unsatisfactory transmission of the heat generated by the flames to the liquid contained in the pan, which implies a slow heating and return to the desired temperature for frying or boiling. To overcome this limitation, it may be necessary to make a pan of metals with a high heat conduction, with the risk, of polluting the fried or boiled food with salts or metal ions which could derive from contact of such metals with the flames.

Document GB-A-2.323.023 describes a known apparatus to fry food products which comprises a pan for frying formed by an upper part and by a lower well. The latter has a side wall heated by a gas heater and is asymmetrical around an axis passing through the center of the upper part.

Document U.S. Pat. No. 4,848,318 describes another known apparatus to fry food products which comprises a pan to heat the oil, which has a central well and burner means disposed at the sides of the well.

Document U.S. Pat. No. 6,073,541 describes another known apparatus for boiling food products in water which comprises a basket for the food, a container for boiling, a combustion chamber with burners disposed at the lower part and a flue for the extraction of the fumes.

One purpose of the present invention is to obtain a pan-type apparatus for frying or boiling food products which overcomes the disadvantages of the state of the art and which, in particular, has a quicker heating capacity compared to the state of the art.

Another purpose is to reduce the consumption of gas by the gas burners which emit the heating flames.

Another purpose is to obtain a greater uniformity of temperature of the liquid in the pan.

Another purpose is to prevent the emission of noxious substances into the liquid in the pan.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a pan-type apparatus according to the present invention is typically usable in a professional environment, to fry or boil food products such as vegetables, pasta, fresh pasta, fish and meat, but also for confectionery products or other, in a suitable liquid, usually frying oil or water.

The apparatus of the present invention provides a pan to contain the liquid, a first casing which delimits inside itself a closed housing chamber which houses at least part of the pan, and burner means disposed in the housing chamber and suitable to generate a flame which, directly or indirectly, heats the pan and therefore the contents.

Moreover, the apparatus comprises flue means to extract or discharge the combustion fumes from the housing chamber where they are produced by the burner means.

Typically, ventilation means are provided upstream of the combustion chamber in order to introduce therein a desired quantity of air.

According to the present invention, the apparatus comprises separation means disposed in the housing chamber and suitable to define at least a first chamber which houses the burner means, and a second chamber which communicates on one side with the first chamber and is connected on the other side to the flue means.

According to the present invention, the separation means are disposed on one side and the other with respect to the pan and comprise at least two pairs of separation walls.

Each pair of separation walls comprises a first internal wall facing toward the pan, and a second external wall facing toward the peripheral walls of the first casing, disposed between the pan and the first wall.

Each pair of separation walls is disposed on one side and the other with respect to the pan so as to define a pair of chambers for each side with respect to the pan, formed by a corresponding first chamber and a corresponding second chamber.

A conveying path is defined for the fumes between the at least one first chamber and the at least one second chamber of each pair of chambers, so as to determine a forced transit of the fumes for a determinate transit time, both to lap the pan in contact along the first chamber, and also laterally to the pan at least along the second chamber.

This allows to optimize the exploitation of the enthalpy content of the fumes, determining a greater speed in heating the liquid and also less consumption of fuel, usually gas. In this way the noxious emissions are also reduced.

Moreover, in this way, once the apparatus has reached normal operating conditions, it is possible to maintain the thermal inertia of the apparatus, minimizing the negative effect of the possible sudden drop in temperature of the liquid which comes from boiling or frying food products each time at room temperature.

Advantageously, the housing chamber, and therefore the first and second chamber defined therein, is fluid-tight, to prevent the leakage or introduction of unwanted fluids, and to keep the stoichiometric ratio between combustion air and gas at optimum values.

In one form of embodiment, the conveying path defines a narrowing in section in the passage of the fumes, which on the one hand improves the heat exchange with the pan, and on the other hand increases the time the fumes remain in the second chamber, allowing to obtain higher temperatures, less waste of heat energy of the fumes and a more complete combustion and hence fewer noxious emissions into the environment.

According to one form of embodiment, the apparatus comprises windows or slits for the passage of the fumes, associated with the pairs of separation walls, which allow fluidic communication between the first and second chamber.

According to a variant, the windows or slits for the passage of the fumes are made on the separation walls reciprocally facing each other, to define a substantially direct passage of the fumes from the first to the second chamber.

According to one form of embodiment, the separation walls are adjacent to each other at a determinate distance so as to define a hollow space with a shape coordinated with the shape of the walls of each side of the pan.

According to a variant, the windows or slits for the passage of the fumes are made on the separation walls staggered with respect to each other in height, so as to define a multiple passage of the fumes from the first chamber into the hollow space and from the hollow space to inside the second chamber.

The present invention also concerns a method for frying or boiling food products in a suitable liquid in an apparatus provided with a pan for containing the liquid. The method according to the present invention provides to define at least a first chamber adjacent to the pan in which a flame is generated that heats the pan, and at least a second chamber that communicates on one side with the first chamber and is connected on the other side to flue means through which the combustion fumes are extracted.

According to the method of the present invention, by means of at least two pairs of separation walls disposed on one side and the other with respect to the pan, of which a first internal wall facing toward the pan, and a second external wall disposed between the pan and the first wall, two pairs of chambers are defined in all on the two sides of the pan. Each pair is formed by a corresponding first chamber and a corresponding second chamber and, along a conveying path for the fumes defined between the first chamber and the second chamber of each pair of chambers, and from the second chamber toward the flue means, a forced transit of the fumes is determined for a determinate transit time, both to lap the pan in contact along the first chamber, and also laterally to the pan at least along the second chamber.

According to one form of embodiment of the method of the present invention, the transit path of the fumes may be formed by a passage along the first chamber and by a subsequent passage directly in the second chamber, and then the fumes exit through the flue means.

According to another form of embodiment of the method of the present invention, the transit path of the fumes may be formed by multiple passages at the sides of the pan for frying or boiling food products; for example, according to a variant, one passage is along the first chamber, an additional intermediate passage is along a hollow space between the first chamber and the second chamber, and another passage is along the second chamber to then exit through the flue means.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings.

Detailed Description of Some Preferential Forms of Embodiment

Figure 1:
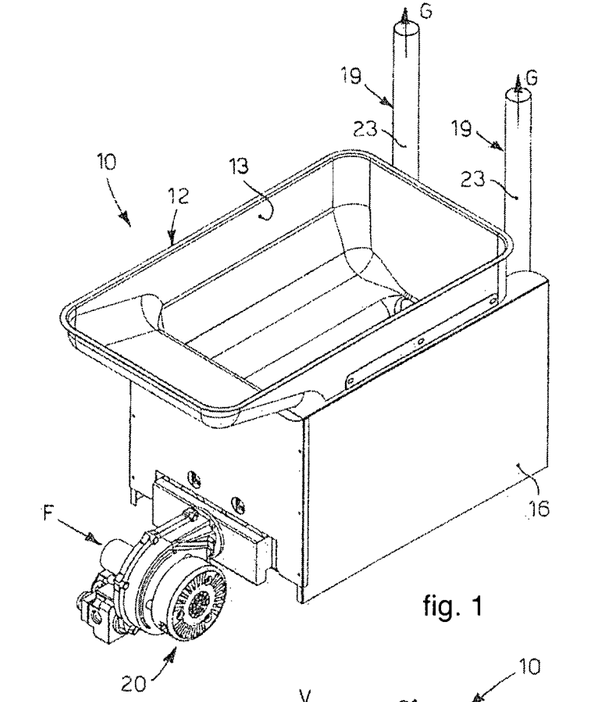
FIG. 1 is a perspective view of a pan-type apparatus according to the present invention.

With reference to the attached drawings, FIG. 1 shows a pan-type apparatus 10 for frying or boiling a food product by means of a liquid that is taken to a desired boiling temperature, or at least frying temperature, for example food oil for frying or water.

Figure 2:
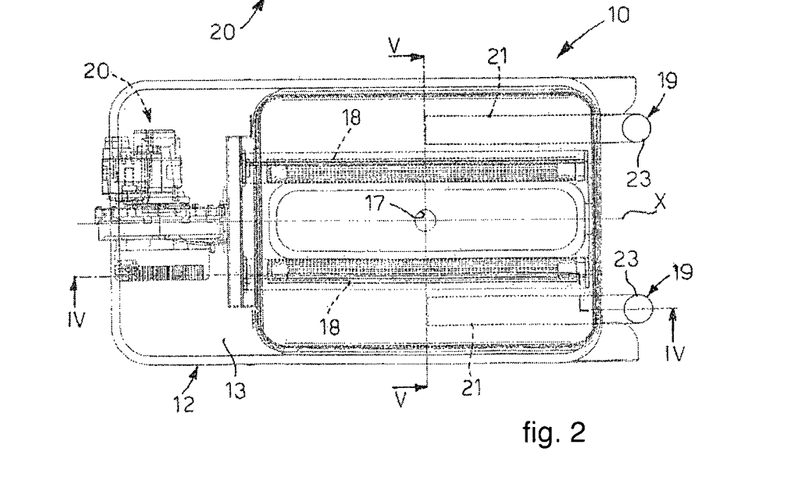
FIG. 2 is a plan view of the apparatus in FIG. 1.
Figure 3:
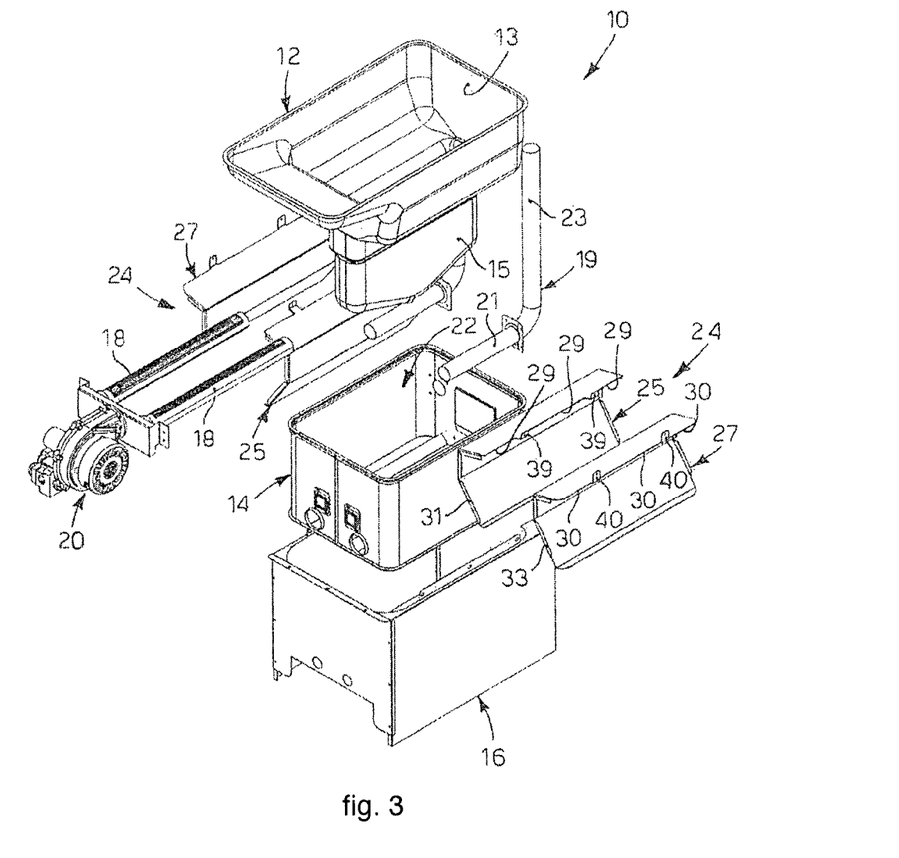
FIG. 3 is a perspective view with separate parts of one form of embodiment of the apparatus in FIG. 1.

The apparatus 10 comprises a pan 12 to contain the liquid for frying or boiling, which pan 12 develops longitudinally along a determinate first axis X (FIG. 2).

From top to bottom, the pan 12 has a first upper part 13, with a flared shape and widened section, which is suitable to house easily inside it a suitable basket, not shown, into which the mass of food to be boiled or fried is disposed; it also has a second lower part 15, with a narrow section and shaped elongated toward the bottom, substantially along a second axis Y, perpendicular to the first axis X, provided with a hole 17 on the bottom, in order to discharge the used boiling or frying water.

The apparatus 10 comprises a first external casing 14, in this case made of metal sheet, into which the pan 12 is inserted.

A second external casing 16 is also provided, normally made of metal material, for example stainless steel, aluminum or suchlike, with a shape and size mating to those of the first casing 14, so that it can be disposed surrounding the latter, slightly distanced from the walls of the first casing 14.

The peripheral walls of the first casing 14 delimit inside them a housing chamber 22 to accommodate the pan 12, in particular to position the second part 15 of the pan 12 which is inserted into an aperture 14a made on the bottom of the first casing 14, whereas the first part 13 of the pan 12 is partly inserted into the housing chamber 22 and partly protrudes from the upper edge 14b of the first casing 14.

Furthermore, gas burners or rings 18 are disposed in the housing chamber 22, to generate a flame that heats, directly or indirectly, the walls of the pan 12 and therefore the liquid inside it. The burners 18 introduce into the housing chamber 22 a desired quantity of gas, and a member to ignite combustion, not shown, is provided.

The burners 18, in this case two in number, are typically elongated in shape and extend parallel to the first axis X, on one side and the other with respect to the pan 12, as can easily be seen in FIG. 2, advantageously symmetrically so as to have uniform heating.

Ventilation means 20 are provided upstream of the housing chamber 22, which are configured to introduce a desired quantity of air inside it, as indicated by the arrow F in FIG. 1, which mixes with the combustion gas fed by the burners 18 to determine the combustion mixture. In particular, by suitably setting the rotation speed of the ventilation means 20 it is possible to determine a correct measuring of the combustion air/gas ratio, so as to have a combustion close to ideal stoichiometric conditions.

The apparatus 10 comprises flues 19 connected to the inside of the housing chamber 22, in this case two in number and with a disposition coordinated with that of the burners 18. The flues 19 are provided to discharge and expel the combustion fumes which are generated in the housing chamber 22. In particular, thanks to the thrust of the ventilation means 20 that thrust the air in the housing chamber 22, the combustion fumes ascend in the flues 19 and are eliminated.

Figure 4:
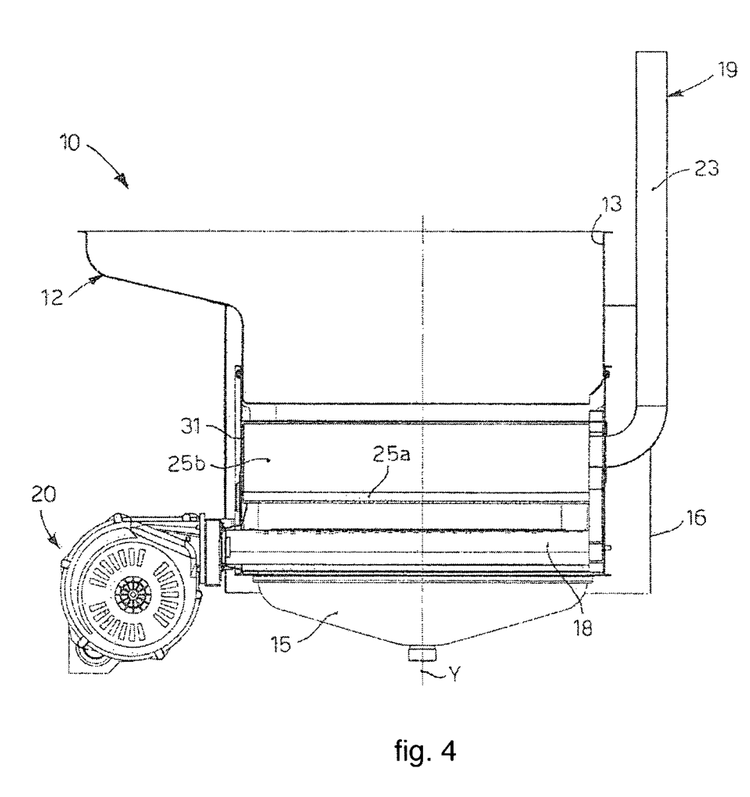
FIG. 4 is a section from IV to IV of FIG. 2.

In the form of embodiment shown, each flue 19 is formed by a shaped tubular element and comprises a first horizontal segment 21, which extends from inside the housing chamber 22 towards the outside (FIG. 2), and a second vertical segment 23 that extends directly outside (FIG. 4). In particular, the first segment 21 of each flue 19 receives the combustion fumes generated by the burner 18 disposed on the same side with respect to the pan 12.

According to one feature of the present invention, the apparatus 10 comprises separation means 24, disposed inside the housing chamber 22 on one side and the other with respect to the first axis X, in coordination with the burners 18 and corresponding flues 19.

The separation means 24 are configured to define, inside the housing chamber 22 on one side and the other of the pan 12 with respect to the first axis X, first combustion chambers 26, close to the pan 12, and second chambers 28 to convey the fumes, on the side of the peripheral walls of the first casing 14. The burners 18 develop in the first chambers 26, while the corresponding flues 19, in particular the first segment 21 of each flue 19, are disposed in the second chambers 28.

Figure 8:
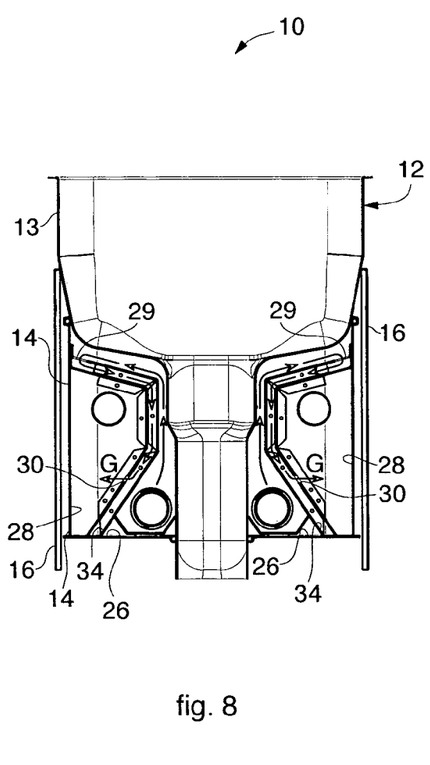
FIG. 8 is a section of another form of embodiment of the apparatus in FIG. 1.

Each first chamber 26 is fluidically connected with the corresponding second chamber 28 on the same side with respect to the pan 12, by means of suitable passage windows or slits 29, 30 which, as explained in more detail hereafter, can determine the direct transit of the fumes from the first chamber 26 to the second chamber 28 (FIGS. 3-6), or a multiple forced path, but all in all still from the first chamber 26 to the second chamber 28 as indicated by the arrows G (FIG. 8).

Consequently, the combustion fumes produced by the burners 18 pass in the first chambers 26 following a determinate conveying path P defined between the separation means 24 and the pan 12.

In the conveying path P, the fumes lap the external walls of the pan 12, and then flow inside the corresponding second chambers 28, from where they are expelled through the respective flues 19.

The hot fumes that transit along the conveying path P contribute, together with the direct heating action of the flames produced by the burners 18, to a uniform increase in the temperature of the liquid contained in the pan 12.

The conveying path P develops from the first chambers 26 toward the second chambers 28 as a channel with a reduced section both with respect to the zone of the first chambers 26 where the burners 18 are housed, and also with respect to the second chambers 28. This determines an acceleration of the fumes in the narrow part, and hence an improved heat exchange with the pan 12, and a deceleration at entrance to the second chambers 28, which determines a longer time in which the fumes remain in the second chambers 28, improving the combustion and hence reducing the noxious emissions into the atmosphere, increasing the speed and uniformity of heating and the overall heat inertia, which gives the advantage of an improved capacity according to the invention to restore, or at least compensate, the typical sudden lowering of temperature of the liquid used for boiling or frying.

The pan 12 is coupled in fluid sealed manner with the first casing 14, so as to determine the fluidic seal inside the first chamber 26 and the second chamber 28, so that the combustion fumes preferentially follow the desired conveying path P and there are no leakages or parasite introductions of fluids.

For the purposes of the present invention the fluidic seal of the chambers 26, 28 is important, in order to keep as constant as possible the correct stoichiometric value of combustion air/gas determined by the ventilation means 20 in cooperation with the burners 18, for an optimized combustion, thus preventing unwanted introductions or losses of fluids.

In particular, the pan 12 is located in the first casing 14, disposing a first packing element 41 in cooperation between the edge that delimits the aperture 14a of the bottom of the first casing 14 and the pan 12, in particular the second part 15 of the pan. Moreover, a second packing element 43 is disposed in cooperation between the upper edge 14b of the first casing 14 and the pan 12, in particular the first part of the pan.

In the form of embodiment shown in the attached drawings, the separation means 24 comprise two pairs of separation walls 25, 27, suitably shaped, of which first separation walls 25 are disposed more toward the pan 12 inside and second separation walls 27 more toward the outside.

In particular, the separation walls 25, 27 are shaped reciprocally mating, each repeating the shape of the other, so that they can be put adjacent so as to define between them, as described in more detail hereafter, a hollow space 34 with a regular shape and coordinated with the shape of the separation walls 25, 27.

Figure 5:
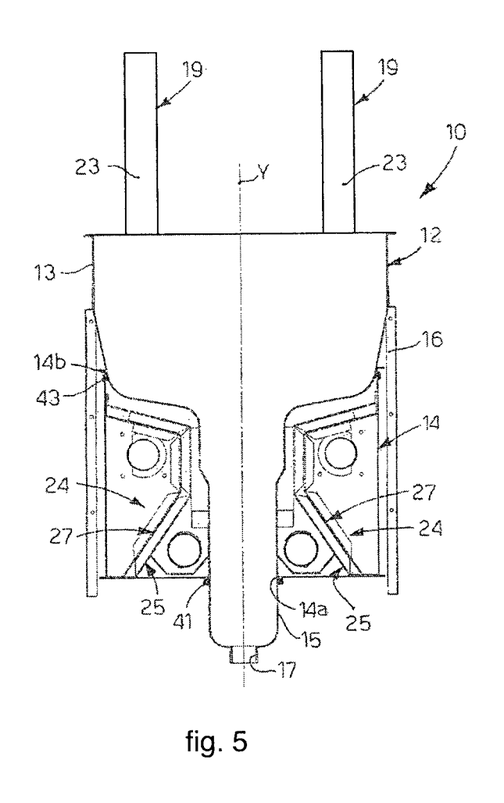
FIG. 5 is a section from V to V of FIG. 2.
Figure 6:
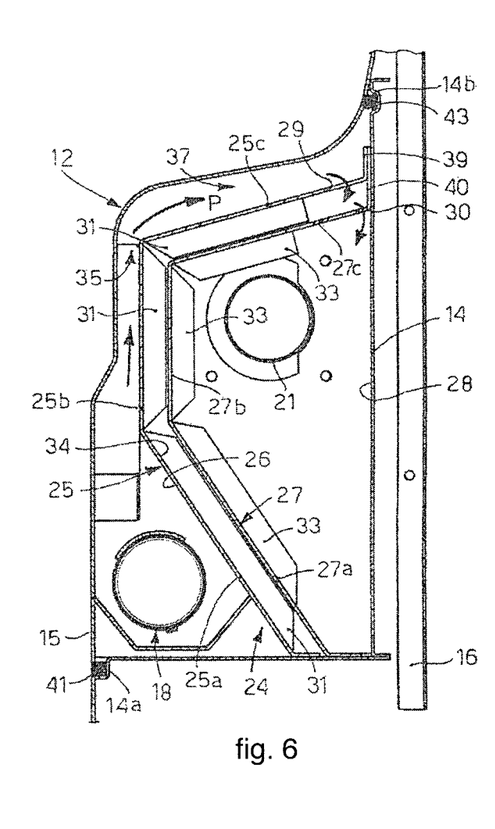
FIG. 6 is an enlarged view of a detail of FIG. 5.

The pairs of separation walls 25, 27 are disposed on one side and the other with respect to the pan 12. With reference to a single side with respect to the pan 12 (FIG. 6), but this description also applies for the opposite side as can be seen in FIG. 5, a determinate pair of separation walls 25, 27 comprises a first internal wall 25, facing toward the pan 12, and a second external wall 27, facing toward the peripheral walls of the first casing 14, disposed between the latter and the first internal wall 25.

In this way, at both sides of the pan 12 with respect to the first axis X, the first chamber 26 is delimited between the pan 12 and the first wall 25, whereas the second chamber 28 is delimited between the peripheral walls of the first casing 14 and the second wall 27.

In the forms of embodiment shown in FIGS. 3-6, the fumes transit more directly from the first chamber 26 to the second chamber 28, whereas in the form of embodiment shown in FIG. 8 the fumes are obliged to make multiple passes, on both sides of the pan 12, from the first chamber 26 to inside the hollow space 34 and from here into the second chamber 28 and then toward the flue 19, thus following a longer, multiple conveying path, thus exploiting more the sensible heat of the fumes.

The first wall 25 and the second wall 27 peripherally comprise mechanical anchoring fins 31, 33, to anchor to the edges of the first casing 14.

The first wall 25 and the second wall 27 are distanced in a desired manner, defining the hollow space 34 which, in one form of embodiment (FIGS. 3-6), promotes the heat insulation between the two chambers 26, 28, preventing any excessively rapid heat dispersion toward the outside and thus contributing to maintain a uniform temperature of the liquid in the pan 12, and in another form of embodiment instead may be exploited to perform multiple passes of the fumes at the sides of the pan 12 (FIG. 8).

Moreover, the first wall 25 and the second wall 27 laterally comprise respective attachment elements 39, 40 to attach them to the first casing 14, which protrude by a desired amount from the bulk respectively of the first wall 25 and the second wall 27.

In some forms of embodiment, the attachment elements 39, 40 protrude so as to define, between the two walls 25, 27 and the walls of the first casing 14, corresponding windows or slits 29, 30 for the fumes to pass through, which allow a fluidic communication between the first chamber 25 and the second chamber 27.

In the forms of embodiment shown in FIGS. 3-6, the windows or slits 29, 30 are directly facing each other, to allow a more direct transit from the first chamber 26 to the second chamber 28, while in the form of embodiment shown in FIG. 8 the windows or slits 29, 30 are made staggered at different heights, to determine the additional passage of the fumes along the hollow space 34.

Instead, the separation walls 25, 27 are adequately fixed, for example welded, to the bottom of the first casing 14, so as to prevent the passage of the fumes in this zone.

In fact, it is important for the present invention that the combustion fumes follow the obliged or preferential conveying path P from the first chamber 26 to the second chamber 26, without leakage, losses or parasite infiltrations.

In the forms of embodiment shown in the drawings, the first wall 25 has a first segment 25a that extends from the bottom of the first casing 14, inclined toward the pan 12, a second segment 25b, substantially vertical, and a third segment 25c, inclined toward the outside with respect to the pan 12.

Each second wall 27 is formed by segments 27a, 27b and 27c that are shaped and positioned in a geometrically coordinated manner with the segments 25a, 25b and 25c, and disposed outside with respect to the latter. In particular, the second wall 27 has a first segment 27a that also extends from the bottom of the first casing 14, inclined toward the pan 12, substantially parallel to the first segment 25a, a second segment 27b, substantially vertical, and a third segment 27c, inclined toward the outside with respect to the pan 12, substantially parallel to the third segment 25c.

The third segments 25c and 27c are provided respectively with the attachment elements 39 and 40 by means of which to also define, at least in the form of embodiment shown in FIGS. 3-6, the associated passage windows or slits 29 and 30.

The segments 25a, 25b, 25c, as we said generically above, are distanced and facing with respect to the analogous segments 27a, 27b, 27c, so as to delimit the hollow space 34.

The geometric configuration of the segments 25a, 25b, 25c and of the mating segments 27a, 27b, 27c with a development, from the bottom of the first casing 14 upward, first inclined toward the inside, then vertical and finally inclined toward the outside, determines an overall configuration of the separation means 24, on one side and the other of the pan 12, concave toward the outside and convex toward the inside with respect to the pan 12. The concave shape to the outside of the separation means 24 determines a housing space suitable for the bulk of the respective flues 19, in particular of the first segments 21 of the flues 19.

The geometrical conformation also derives from the spatial configuration described: it has a narrowing in section of the conveying path P from the first chamber 26 to the second chamber 28 as discussed above.

The disposition of the first segment 25a, in particular the attachment position of the first segment 25a on the first casing 14 from which it extends toward the inside in an inclined manner, is distanced from the pan 12 to define the housing space for the burners 18 in the first chamber 26, while the disposition of the second segment 25b and the third segment 25c substantially follows close to the development of the external surface of the pan 12, remaining distanced in a desired manner so as to delimit the conveying path P.

The second segment 25b, in cooperation with the pan 12, in particular with the second part 15 of the pan 12, delimits a first conveying channel 35, substantially vertical, which extends from the first chamber 26, while the third segment 25c, in cooperation with the pan 12, in particular with the portion of the first part 13 that does not protrude from the upper edge 14b of the first casing 14, delimits a second conveying channel 37, inclined toward the outside with respect to the pan 12: the first channel 35 and second channel 37 have a restricted passage section compared to the first chamber 26 and the second chamber 28.

The first conveying channel 35 determines a rising motion of the fumes, to lap in particular the second lower part 15 of the pan 12, in a direction substantially parallel to the second axis Y.

The second conveying channel 37, instead, determines a motion of the fumes with a direction transverse to the second axis Y and toward the outside, to lap the bottom of the first part 13 of the pan 12.

The second conveying channel 37 terminates in correspondence with the passage window or slot 29 associated with the first wall 25.

In the forms of embodiment shown in FIGS. 3-6, the passage window or slot 29 directly faces the passage window or slot 30 associated with the second wall 27 which, in turn, opens into the second chamber 28.

Therefore, in the forms of embodiment shown in FIGS. 3-6, the motion of the fumes again changes direction from the second channel 37, entering into the window or slot 29 from where it then transits preferentially through the window or slot 30, then passing into the second chamber 28. In this way, the first channel 35 and second channel 37 determine the conveying path P between the first chamber 26 and the second chamber 28 with the desired narrowing in section as above.

In the form of embodiment shown in FIG. 8, the motion of the fumes changes direction from the second channel 37, entering into the window or slot 29, and the latter opens into the hollow space 34, to convey the fumes toward the additional passage along the hollow space 34. In a lower position along the hollow space 34, the passage window or slot 30 is provided, associated with the second wall 27 which in turn opens into the second chamber 28 in correspondence with which the fumes exit from the hollow space 34 to pass into the second chamber 28. In this form of embodiment, the conveying path P between the first chamber 26 and the second chamber 28 is a multiple path, formed not only by the first channel 35 and the second channel 37, but also by the passage along the hollow space 34, in this case too determining the desired narrowing in section as described above.

Figure 7:
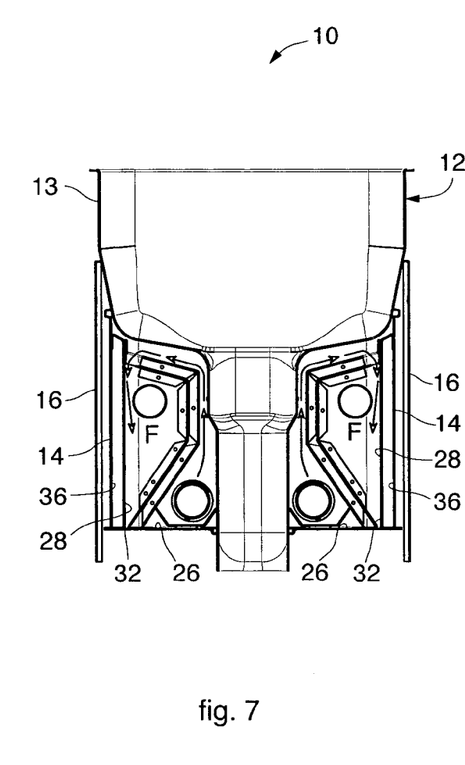
FIG. 7 is a section of a variant of the apparatus in FIG. 1.
Figure 9:
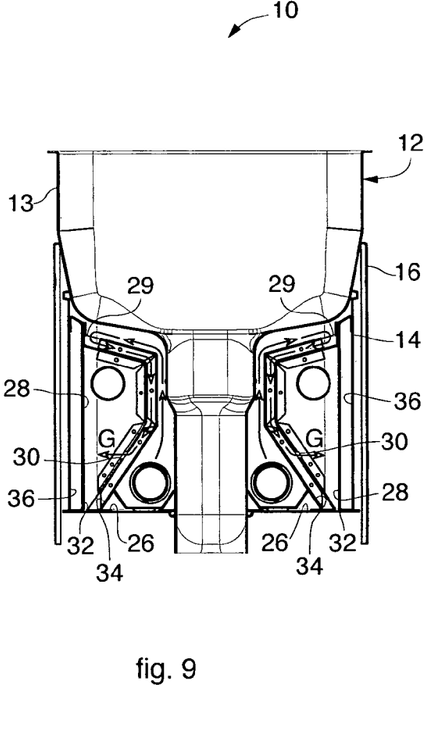
FIG. 9 is a section of a variant of FIG. 8.

FIGS. 7 and 9 show variants of the forms of embodiment with a direct passage of the fumes from the first chamber 26 to the second chamber 28 (FIGS. 3-6) and with an additional passage of the fumes along the hollow space 34 (FIG. 8), in both of which lateral panels 32 are provided, disposed in the first internal casing 14, adjacent to the peripheral walls of the latter.

The lateral panels 32 are formed by walls distanced from the peripheral walls of the first casing 14 to define, at least on one side and the other of the pan 12, advantageously symmetrically, possibly surrounding the pan 12 completely, hollow spaces 36 with a fluidic seal, containing air, inside which there is no passage of hot fumes. Thanks to the lateral panels 32 that define the hollow spaces 36 containing air, it is possible to increase the heat insulation of the peripheral walls of the first casing 14 with respect to the housing chamber 22 containing the burners or rings 18, and consequently to expose the second casing 16 too to lower temperatures so that, externally, the walls of the apparatus 10 are colder and therefore safer and more comfortable for the user, reducing the risk of burns, scalds or similar accidents due to the excessive temperature.

The invention claimed is:

1. Pantype apparatus to fry or boil food products in a suitable liquid, comprising:
   a pan to contain the liquid;
   a first casing which delimits inside itself a closed housing chamber which houses at least part of the pan;
   burner means disposed in the housing chamber and suitable to generate a flame which, directly or indirectly, heats the pan;
   flue means to extract combustion fumes from the housing chamber;
   separation means disposed in the housing chamber and suitable to define at least a first chamber adjacent to the pan, which houses said burner means, and a second chamber, between the first chamber and the walls of the first casing, which communicates on one side with the first chamber and is connected on the other side to said flue means, wherein the separation means are disposed on one side and on the other with respect to the pan and comprise at least two pairs of separation walls, each pair of separation walls comprising a first internal wall facing toward the pan, and a second external wall facing toward the peripheral walls of the first casing, disposed between said pan and the first wall, each pair of separation walls being disposed on one side and the other with respect to the pan so as to define, for each side with respect to the pan, a pair of chambers, formed by a corresponding first chamber and a corresponding second chamber, a conveying path being defined for the fumes between the first chamber and the second chamber of each pair of chambers, and from the second chamber toward said flue means, so as to determine a forced transit of the fumes for a determinate transit time, both to lap the pan in contact along said first chamber, and also laterally to the pan at least along the second chamber.

2. Apparatus as in claim 1, wherein said conveying path defines a narrowing in section in the passage of the combustion fumes.

3. Apparatus as in claim 1, wherein the pan is coupled in sealed manner to the first casing by means of sealing means, so as to determine the fluidic sealing inside the at least one first chamber and the at least one second chamber, so that the combustion fumes follow said conveying path in a preferential manner.

4. Apparatus as in claim 1, wherein it comprises windows or slits for the passage of the fumes associated to the pairs of separation walls which allow the fluidic communication between the first chamber and the second chamber.

5. Apparatus as in claim 4, wherein the windows or slits for the passage of the fumes are made on the separation walls reciprocally facing each other to define a substantially direct passage of the fumes from the first chamber to the second chamber.

6. Apparatus as in claim 1, wherein the separation walls are positioned alongside each other at a determinate distance to define a hollow space with a shape coordinated to the shape of the walls on each side of the pan.

7. Apparatus as in claim 6, wherein the windows or slits for the passage of the fumes are made on the separation walls staggered with respect to each other in height, so as to define a multiple passage of the fumes from the first chamber to inside the hollow space and from the hollow space to inside the second chamber.

8. Apparatus as in claim 1, wherein the first wall and the second wall laterally comprise respective attachment elements for attachment to the first casing, which protrude by a desired amount from the bulk respectively of the first wall and the second wall.

9. Apparatus as in claim 8 wherein the attachment elements protrude so as to define, between the separation first and second walls and the walls of the first casing, corresponding windows or slits for the passage of the fumes, which allow fluidic communication between the first chamber and the second chamber.

10. Apparatus as in claim 1, wherein each first wall comprises a first segment which extends from the bottom of the first casing, inclined toward the pan, a second segment substantially vertical, and a third segment inclined toward the outside with respect to the pan, and in that each second wall is formed by segments which are shaped and positioned in a manner geometrically coordinated with said segments, comprising a first segment which also extends from the bottom of the first casing inclined toward the pan, substantially parallel to the first segment, a second segment substantially vertical, and a third segment inclined toward the outside with respect to the pan, substantially parallel to the third segment.

11. Apparatus as in claim 10, wherein the disposition of the first segment is initially distanced from the pan in order to define the housing space of the burner means in the first chamber, and the disposition of the second segment and of the third segment substantially follows closely the development of the external surface of the pan, remaining distanced in a desired manner so as to delimit said conveying path.

12. Apparatus as in claim 11, wherein the second segment delimits, in cooperation with the pan, a first conveying channel, substantially vertical, which extends from the first chamber, while the third segment delimits, in cooperation with the pan, a second conveying channel, inclined toward the outside with respect to the pan, which directs the fumes toward the second chamber, said first channel and said second channel having a restricted passage section with respect to the first chamber and to the second chamber.

13. Apparatus as in claim 1, wherein it comprises lateral panels disposed in the first internal casing which are formed by walls distanced from the peripheral walls of the first casing to define hollow spaces at least on one side and the other of the pan.

* * * * *